US012785616B2

United States Patent

Ripalda Cobián

(12) United States Patent
(10) Patent No.: US 12,785,616 B2
(45) Date of Patent: Nov. 3, 2026

(54) PHOTOVOLTAIC SYSTEM FOR LOW SOLAR ELEVATION ANGLES

(71) Applicant: CONSEJO SUPERIOR DE INVESTIGACIONES CIENTIFICAS (CSIC), Madrid (ES)

(72) Inventor: José María Ripalda Cobián, Tres Cantos (ES)

(73) Assignee: CONSEJO SUPERIOR DE INVESTIGACIONES CIENTIFICAS (CSIC), Madrid (ES)

( * ) Notice: Subject to any disclaimer, the term of this patent is extended or adjusted under 35 U.S.C. 154(b) by 252 days.

(21) Appl. No.: 18/685,683

(22) PCT Filed: Sep. 2, 2022

(86) PCT No.: PCT/EP2022/074507

§ 371 (c)(1),
(2) Date: Feb. 22, 2024

(87) PCT Pub. No.: WO2023/031426

PCT Pub. Date: Mar. 9, 2023

(65) Prior Publication Data

US 2025/0132722 A1 Apr. 24, 2025

(30) Foreign Application Priority Data

Sep. 6, 2021 (EP) .................................... 21382798

(51) Int. Cl.
*H02S 40/22* (2014.01)
*H02S 20/23* (2014.01)

(52) U.S. Cl.
CPC ............. *H02S 40/22* (2014.12); *H02S 20/23* (2014.12)

(58) Field of Classification Search
CPC ..... H02S 20/23; H02S 40/22; G02B 5/08–18; F24S 23/80
See application file for complete search history.

(56) References Cited

U.S. PATENT DOCUMENTS 4,800,868 A * 1/1989 Appeldom ............. F24S 23/80 136/246
5,538,563 A 7/1996 Finkl (Continued)

FOREIGN PATENT DOCUMENTS

EP 2881997 A1 6/2015
JP S60187065 A 9/1985
KR 101854452 B1 6/2018

OTHER PUBLICATIONS

International Search Report and Written Opinion of International Application No. PCT/EP2022/074507, dated Dec. 12, 2022, 9 pages.

*Primary Examiner* — Kourtney R S Carlson
(74) *Attorney, Agent, or Firm* — Chrisman Gallo Tochtrop LLC

(57) ABSTRACT

A photovoltaic system, and an assembly method, for maximizing electric power production during low solar elevation angles, including at least a bifacial photovoltaic module, disposed on a substantially vertical first plane, mounted on a structural support and placed substantially facing the east on one side and the west on the other side, and at least two specular or metallic reflectors facing each side of the bifacial photovoltaic module at an angle of 73°±20° relative to the vertical. The reflectors are shaped or structured so that a fraction of the sun-light incident along a direction that is parallel to the photovoltaic module is redirected towards the photovoltaic module, thus maximizing the electric power production for conditions of low solar elevation such as winter, early morning and late afternoon, and protecting the (Continued)

photovoltaic module from overheating during noon and summer.

20 Claims, 11 Drawing Sheets

(56) References Cited

U.S. PATENT DOCUMENTS

| | | | |
|---|---|---|---|
| 6,306,510 | B1 | 10/2001 | Verlinden et al. |
| 2011/0197968 | A1 | 8/2011 | Montgomery |
| 2015/0326175 | A1 | 11/2015 | Austin |
| 2017/0222600 | A1 | 8/2017 | Panish |
| 2020/0235698 | A1 * | 7/2020 | Citron ..................... H02S 20/32 |

* cited by examiner

PHOTOVOLTAIC SYSTEM FOR LOW SOLAR ELEVATION ANGLES

CROSS-REFERENCE TO RELATED APPLICATIONS

This is a National Stage application of PCT International Application PCT/EP2022/074507, filed on Sep. 2, 2022, which claims the benefit of European Patent Application EP21382798.3, filed on Sep. 6, 2021, both of which are incorporated herein by reference in their entirety.

OBJECT OF THE INVENTION

This invention is encompassed within the field of photovoltaic technology. One object of the invention is providing a photovoltaic system to maximize the electric power production for conditions of low solar elevation such as winter, early morning and evening, which often coincide with the electric grid peak demand, hence avoiding periods of oversupply and curtailing, while at the same time the photovoltaic solar panels being vertical may be protected from soiling, hail, overheating, and subsequent efficiency drops.

BACKGROUND OF THE INVENTION

Due to the rapid cost reduction of photovoltaics (PV), recent forecasts are predicting that several tens of terawatts of PV capacity will be deployed before 2050. Because of the high cost of electricity storage, there is interest in PV systems capable of higher electricity production during winter and the early and late hours of the day, as these are anticipated to be times of high energy demand. In the regions more suitable for PV energy production, it is anticipated that it will be necessary to cover a few percent of the available land with PV power plants. Such a large-scale deployment will have a direct impact in local and global temperatures of the order of a few tenths of a centigrade degree, as the highly absorbing solar panels will increase the amount of heat absorbed by the earth. Thus, there is also a need for PV systems that reflect back to space a larger fraction of the heat from the sun.

The majority of the PV systems known in the state of the art are either fixed tilt systems, two axis tracking systems, or single horizontal axis systems, with utility scale installations strongly favoring the latter, which have very poor production capacity during the winter months. In this scenario, new PV systems optimized for maximum production in the winter months are highly desirable.

As PV grows to be the largest producer of electricity, there will be too much PV power being produced at noon and during summer, and PV plants will be forced to shut down temporarily at the time of their maximum production capacity. This is known as curtailment and it is already happening at a massive scale in regions with high PV market penetration. Curtailing also happens frequently during spring and autumn because PV production is slightly lower than in summer, but power demand for air conditioning is much lower than in summer.

With current PV technology there is a mismatch between the hours of maximum electricity demand and the hours of maximum electricity production, because PV systems in the current state of the art have a poor production capacity during the early morning and late afternoon. As a result, the net load (the difference between the total electricity demand and the PV electricity supply) follows what is known as the "duck curve". So current PV technology faces two challenges: the scarcity of the solar resource during winter and the "duck curve". Both challenges can be addressed with PV systems optimized for low solar elevation angles. One possibility to increase production at low solar elevation angles is placing PV solar panel modules in a vertical or nearly vertical orientation. But this results in lower yearly energy production, and thus, this solution has not attracted much attention up to now. This drawback can be offset using reflectors to boost the energy collection of the solar panels. The use of mirrors in PV technology has been extensively explored, however PV systems using reflectors in the prior art have been designed to make the most of the available solar power during midday, and as a consequence these systems are prone to accelerated solar panel degradation due to excessive temperature, offsetting the economic advantage of using reflectors. Furthermore, maximum yearly energy yield does not necessarily coincide with maximum return on investment, as the price of electricity fluctuates as a function of supply and demand, and an oversupply of PV electricity is likely to occur during midday in all seasons except winter. Another notable difficulty in this type of PV system is to find a design where the economic benefit obtained by increasing the energy production is higher than the additional cost of the reflectors.

Patent US 2011/197968 A1 describes several embodiments comprising vertical bifacial solar panel modules, a main horizontal reflector, and a large transparent optical element ("deflector") covering the whole system at an angle to both the module and the reflector. Some embodiments are described as useful to increase power production at the beginning and the end of the day, and some others described as useful to increase power production in winter, but none of them is designed for both purposes. The described transparent deflector not only adds to the cost of the main reflector, it also causes additional optical losses. Patent US 2011/197968 A1 does not describe methods or means to avoid the deleterious effects of high temperatures.

Patent EP2881997A1 describes a solar panel module tilted towards the south with an adjacent reflector. Thus, the module is directly facing the sun at most times during midday, and the reflector further increases the received power and the solar panel temperature. Methods or means to avoid overheating the solar panels are not described.

Many of the sought advantages can be obtained by using two-axis tracking or using vertical solar panel modules with azimuthal tracking and horizontal reflectors as in document JPS60187065, but the capital cost and maintenance cost of trackers reduces the return on investment. Furthermore, a well-known drawback of azimuthal tracking and two axis trackers is the need to use a large separation between trackers to avoid shading, increasing the land required for a given energy production.

Therefore, there is a need for a PV system without moving parts designed for maximum return on investment under the premise that the value of electricity will be lower at times of high solar elevation due to excessive supply of PV electricity in the network. The resulting system should also maintain the temperature of the solar panel modules as low as possible to slow degradation and increase the efficiency.

DESCRIPTION OF THE INVENTION

A new photovoltaic system for maximizing electric power production during low solar elevation angles is disclosed herein with which it has been found that at least the above disadvantages relating to the prior art solutions are mitigated.

More in particular, there is provided a photovoltaic system for maximizing electric power production during low solar elevation angles, wherein said photovoltaic system comprises:

- a static support structure;
- at least a bifacial photovoltaic module mounted on said support structure in a position substantially perpendicular to the east-west axis, with an allowable deviation of ±20°;
- at least two metallic or substantially specular reflectors with a diffuse reflectance, being less than half of the total hemispheric reflectance, mounted on said support structure, with a total added length of the reflectors substantially matching or exceeding the added length of the photovoltaic modules, and a width 1.67 times the height of the photovoltaic module, with an allowable deviation of ±30% of said width, tilted to face each side of the bifacial photovoltaic module, so that the planes comprising the reflectors intersect the planes comprising the bifacial photovoltaic modules at an angle substantially of 73°, with an allowable deviation of ±20°. In a preferred embodiment, the planes comprising the reflectors and a plane comprising the photovoltaic module intersect at an angle between 65° and 83°.

The solar reflectors may comprise a plurality of facets parallel to an azimuthal direction rotated ±54° away from the north-south axis with an allowable deviation of ±20°, the direction of said rotation being so that the outer ends of the facets farthest from the photovoltaic module are rotated away from the equator. Said azimuthal direction is given by the intersection of a plane parallel to said facets and the horizontal plane.

A general class of reflectors meeting the description above has a translation symmetry axis, but such a symmetry is not in itself a requirement for the present invention.

The reflectors in the present invention have an engineered bidirectional reflectance distribution function (BRDF) so that sunlight incident with an azimuth angle parallel to the solar panel modules that would otherwise not be collected is reflected to the modules. When using bifacial modules facing east-west in the northern hemisphere it is advantageous to redirect sunlight from the south to increase the energy production at noon, especially during winter, when the sun is at low elevation angles. Reflecting facets to change the azimuthal direction of the reflected rays can be created in glass for example by creating crack lines that produce total internal reflection as described in U.S. Pat. No. 6,306,510B1.

The reflectors may be constructed with any of a number of materials and methods known in the prior art. The surface of a transparent material can be highly reflective at some incidence angles when the conditions for total internal reflection are met. Alternatively, it can be made highly reflective at all incidence angles with a metallic (mostly silver or aluminum) thin film coating as it is customary in glass and polymer mirrors. Bent aluminum sheet can be used as a reflector to minimize initial capital costs, while glass mirrors are preferable for durability and polymer mirrors are preferable for higher return on investment. Polymer mirrors are also known in the prior art to have advantages such as low weight, low cost, and can be shaped with precision casting, molding or extrusion, but may require a glass cover or additives to protect the molecular structure from outside exposure and ultraviolet radiation damage. Acrylic polymers such as poly(methyl methacrylate) are suitable for the present invention due to their good resistance to ultraviolet radiation, scratch resistance, and high transparency. Multiple reflective facets can be fabricated on poly(methyl methacrylate) by shaping the polymer by extrusion, casting or embossing, followed by vacuum metallizing or adhesion of a commercial metallized polymer film (typically Mylar, BoPET, or other forms of polyester). Alternatively, total internal reflection facets can be defined on a silicone layer adhered to a protective top glass and to a bottom mirror.

If the reflectors are made of a metallized transparent material such as a glass or polymer, the facets can be placed substantially perpendicular to the reflectors, with an allowable deviation of ±20°, and the height of the facets is preferably equal to the distance between facets, with a deviation of ±30% said distance. In this case most light rays are reflected in two mutually perpendicular facets of the reflector. If instead a metallic sheet is used a reflector, it is preferable to have each light ray reflecting only once to limit reflection losses. Consequently, the facets should preferably not be at an angle larger than 70° away from the main reflector plane.

The reflectors required by the present invention can also be based solely on total internal reflection, without using metalized surfaces or interferential multilayers. In the previous state of the art, optical designs for reflectors based solely on total internal reflection are typically cube corner retroreflectors that only work at near normal incidence, as these are typically used to make vehicles visible at night when illuminated by the headlights of another vehicle. Reflectors based on microprismatic arrays with translation symmetry along a direction parallel to the main reflector plane are also used in the state of the art in light guides with low losses for light propagation along a direction nearly parallel to the translation symmetry direction of the array. Such microprismatic arrays are based on two mutually perpendicular sets of total internal reflection facets. These optical designs only work as an ideal retroreflector for a narrow range of angles of incidence (typically +/−10° around normal incidence). A preferred embodiment of the present invention uses a dielectric microprismatic array. Optionally, the total internal reflection facets are oriented to produce retroreflection at high incidence angles. A benefit of such design in comparison with state-of-the-art microprismatic array retroreflectors is that retroreflection occurs at a wider range of incidence angles. As an example: per Snell's law, a range of incidence angles inside the dielectric of +/−5° around the surface normal corresponds to +/−7.5° range outside the dielectric (assuming a 1.5 refractive index), but a range of incidence angles inside the dielectric from 30° to 40° corresponds to a much wider range outside the dielectric: from 49° to 75°. As a consequence, the reflector component of the present invention advantageously may operate as a retroreflector in a wider range of incidence angles. Most importantly, when the incidence angle has a vector component along the translation symmetry direction of the microprismatic array, this vector component increases the range of incidence angles resulting in total internal reflection. In this case the resulting light path is best described not as a retroreflection but as a skew reflection, or light deflection, as the vector component along the translational symmetry direction of the microsprismatic array remains unaltered after reflection, while the other vector components are reversed. In embodiments of the present invention using these partially transparent microprismatic arrays, it might be advantageous to use an auxiliary reflector or mirror underneath the microprismatic array to increase the light collected by the solar panels. This auxiliary reflector has much relaxed requirements in terms of reflectivity and specularity (a white film might suffice), as the performance of the system is mostly determined by the microprismatic array main reflector.

Some embodiments of the invention can be adapted to allow for plant growth under the reflectors by using partially transmissive reflectors. The possibility to use dichroic spectrally selective reflectors is especially advantageous. Spectrally selective dielectric mirrors based on interferential multilayers (also known as Bragg reflectors or dichroic mirrors) can be designed to have very low absorption losses, and selective reflectance at specific wavelengths while having high transmission at most other wavelengths. For embodiments allowing for simultaneous agricultural production and photovoltaic production (known as agrivoltaic systems), it might be advantageous to have high transmission of those specific photon energies required for photosynthesis. On the other hand high reflectivity is required at energies above the band gap absorption threshold of the photovoltaic modules, and low reflectivity is required for photons with energies below said threshold, as such photons do not result in electrical power generation, and only result in additional thermal load on the photovoltaic modules, reducing their efficiency and lifetime. Deleterious ultraviolet light is to be absorbed by the reflector. A reflector meeting all of these requirements can be fabricated on a polyethylene terephthalate substrate by vacuum deposition of 110 nm of $TiO_2$, followed by 190 nm of $SiO_2$, 95 nm of $TiO_2$, 150 nm of $SiO_2$, 75 nm of $TiO_2$, 120 nm of $SiO_2$, and 60 nm of $TiO_2$. Lower cost dichroic reflectors can be fabricated with polymer multilayers obtained by the extrusion layer multiplication technique, but high performance requires a few hundred layers due to the lower refractive index contrast of these materials.

In distinguishing the present invention from the prior art, it is important to note that the reflectors here proposed are fundamentally different from the Fresnel reflectors used in concentrating solar systems, as bundles of rays are not made to converge on a focal point, but remain parallel after reflection. In some embodiments of the present invention, it may be advantageous to diffusely scatter some of the incoming light or to reflect the light in a diverging beam to decrease the risk of local hot spots in the PV modules due to concave reflector deformities accidentally concentrating the sunlight, as this might damage the PV modules.

At a typical latitude of interest for PV applications (40°N), the elevation of the sun during the winter months ranges from 20° to 35°, while the azimuth ranges from 90° to 270°. During winter, lower temperatures allow for higher PV efficiency, and due to the low elevation of the sun, a fraction of the sunlight directly hits the PV module disposed in a vertical plane with a small angle of incidence, while a similar fraction hits the reflectors at a grazing angle and then the module, almost doubling the amount of sunlight collected by the PV solar panels. Collecting more light at low solar elevation angles is also advantageous because the active semiconductor material most often used in PV devices (silicon) has an absorption threshold or band gap energy lower than optimal for the solar spectrum corresponding to high solar elevation angles, and consequently the efficiency increases at low solar elevation angles because the longer trajectory through the atmosphere reduces the average energy of the photons arriving at the solar panel modules.

During summer the sun reaches much higher elevation angles, and the here proposed PV modules face away from the sun at most times. The higher temperatures and the lower expected electricity prices during summer make it undesirable to place the PV modules directly facing the sun as in the current state of the art. Curtailing and oversupply reduce the need to produce electricity during noon and summer, and the high temperatures increase the risk of PV module damage, and thus the here proposed configuration remains nearly optimal in the summer.

High temperature is detrimental in PV technology because it reduces the efficiency and increases the degradation and failure rates of the solar panels. During noon in summer, the sun is very high above the horizon, and the here proposed reflectors reject most of the incoming heat back to the atmosphere, reducing local and global temperatures. The heat rejecting properties of the specular or metallic reflectors can also be beneficial in floating PV power plants on water reservoirs to reduce water evaporation losses.

The energy yield depends very critically on the geometry of the reflectors, and the result of any significant change in the optical design is not obvious as testing each design requires experiments or ray tracing modeling with hourly meteorological data (such as temperatures, wind speed and irradiance) for a whole year in several relevant locations with different meteorological conditions. An appropriate geometry for a particular location can be determined by minimizing the levelized cost of energy (LCOE), or preferably by maximizing the return on investment if the temporal variations of the electricity selling price can be forecast.

The present invention is designed to have optimal performance when the elevation of the sun is approximately 35° (±10°). To avoid an inhomogeneous reflection on the PV panels under these illumination conditions requires using mirrors that are 1.67 m wide (±30%), assuming a PV panel height of 1 m.

The photovoltaic system can comprise a plurality of bifacial photovoltaic modules and reflectors, arranged in at least a row along the north-south axis with an allowable deviation of ±20°. The reflectors extend over a longer length than the photovoltaic modules at both ends of each row to avoid an inhomogeneous reflection on the bifacial photovoltaic modules at the edges of the row. Also, the system can comprise a plurality of said rows arranged with an optimal spacing of 3.2 m with an allowable deviation of ±1.1 m depending mostly on the cost of the terrain relative to other costs in the system and assuming a PV panel height of 1 m.

To maximize the acceptance angle of the described optical system, the tilt angle of the reflectors should be such that they only block the part of the sky already blocked by other obstacles such as neighboring solar panels. Consequently, it is a design criterion of the present invention that the planes comprising the reflectors must intersect the planes comprising the photovoltaic modules at an angle whose cosine is half of the ratio of the photovoltaic panel height to the mirror width. A deviation of ±20° can be allowed for said angle, as considerations pertaining to a specific installation location (e.g.: terrain topography, latitude, soiling, meteorological conditions) might favor a slightly different geometry. For a location 40 degrees away from the equator, the most advantageous configuration has the planes comprising the reflectors intersecting the planes comprising the photovoltaic modules at an angle of 73°±20°.

Tilting the reflectors also allows for a higher peak power areal density, and consequently the optimal separation between rows of PV panels in the east-west direction is 3.2±1.1 times the height of the PV panel.

The invention also refers to an assembling method for assembling a photovoltaic system described, the method comprising:

placing the at least one bifacial photovoltaic module on the static support structure;

orienting the at least one bifacial photovoltaic module in a position substantially perpendicular to the east-west axis, with an allowable deviation of ±20°;

placing the at least two specular or metallic reflectors on said support structure, tilted to face each side of the bifacial photovoltaic module, so that a plane comprising the reflectors intersects a plane comprising the bifacial photovoltaic module at an angle substantially of 73°, with an allowable deviation of ±20°, and placing on the reflectors the plurality of facets, and placing said facets within the reflectors parallel to an azimuthal direction 54° away from the north-south axis with an allowable deviation of ±20°, so that the outer ends of the facets farthest from the photovoltaic module are rotated away from the equator.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

A detailed explanation of an example of preferred embodiment of the object of the present invention is provided below, with the aid of the aforementioned figures.

The system geometry has been optimized through ray tracing modeling with actual meteorological data (such as temperatures, wind speed and irradiance) from the deployment location taking into account the expected economic value of the electricity at different times, and minimizing the temperature of the solar panels to avoid degradation and failure of the solar panels. A range of values for the parameters defining the system geometry has been tested, and modelling results have been validated by comparison with experimental results obtained for several specific geometries.

Figure 1A:
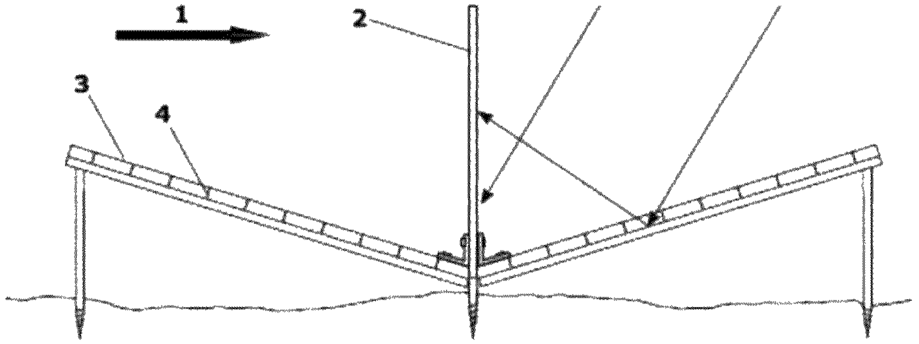
FIG. 1*a*.—Illustrates a schematic front view of a PV system according to a first preferred embodiment of the invention where it is shown a vertical bifacial PV module (2) and two tilted solar reflectors (3), one on each side of the module, each reflector made of a transparent polymer, comprising a main metallized reflective surface, and a set of smaller reflecting facets fabricated as air/polymer interfaces (fissures or indentations) producing total internal reflection. Two parallel light rays are illustrated, one directly incident on the solar panel module, and another reflected and then absorbed on the solar panel module.

FIG. 1*a* illustrates a schematic front view of a PV system (1) according to a first preferred embodiment of the invention with no solar tracking, where it is shown bifacial PV modules (2) on a substantially vertical plane perpendicular to the east-west axis, and solar reflectors (3) tilted towards the immediately adjacent PV modules, the reflectors (3) comprising a set of reflective facets (4) substantially perpendicular to the main reflector plane (3).

A 90° reflector tilt angle (reflectors perpendicular to the PV modules) allows for a simpler structural support, and might be advantageous for particular applications and geographical locations, but generally leads to lower yearly energy yields than a system with tilted reflectors.

Figure 1B:
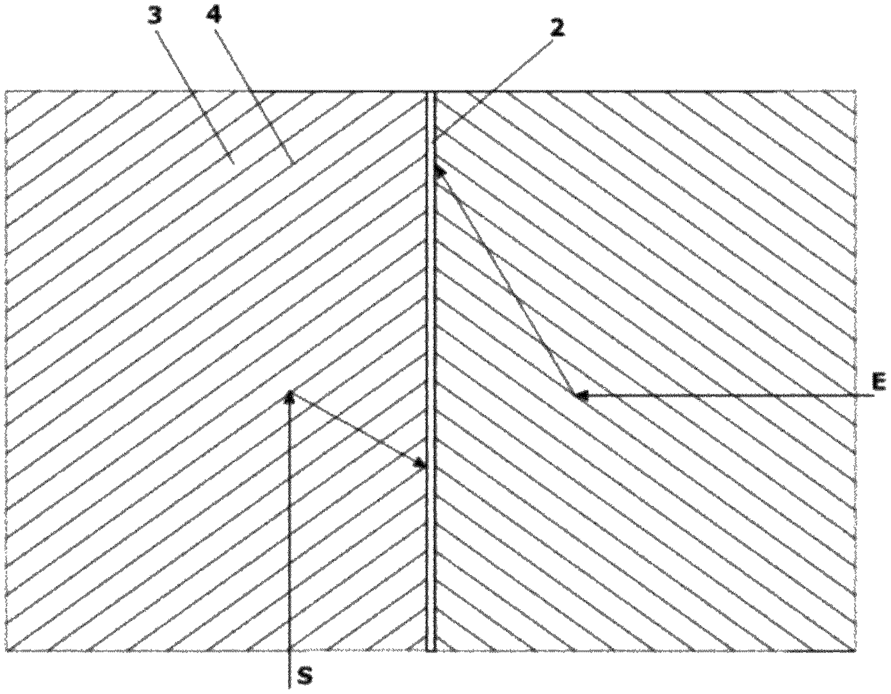
FIG. 1*b*.—Illustrates a top view of the preferred embodiment also represented in FIG. 1*a* with solar reflectors comprising a main reflecting surface, and a set of reflecting facets perpendicular to the main reflector plane and parallel to an azimuthal direction 54°±20° away from the north-south axis, the direction of said azimuthal rotation being such that the outer ends of the facets (farthest from the PV modules) are rotated away from the equator.
Figure 5:
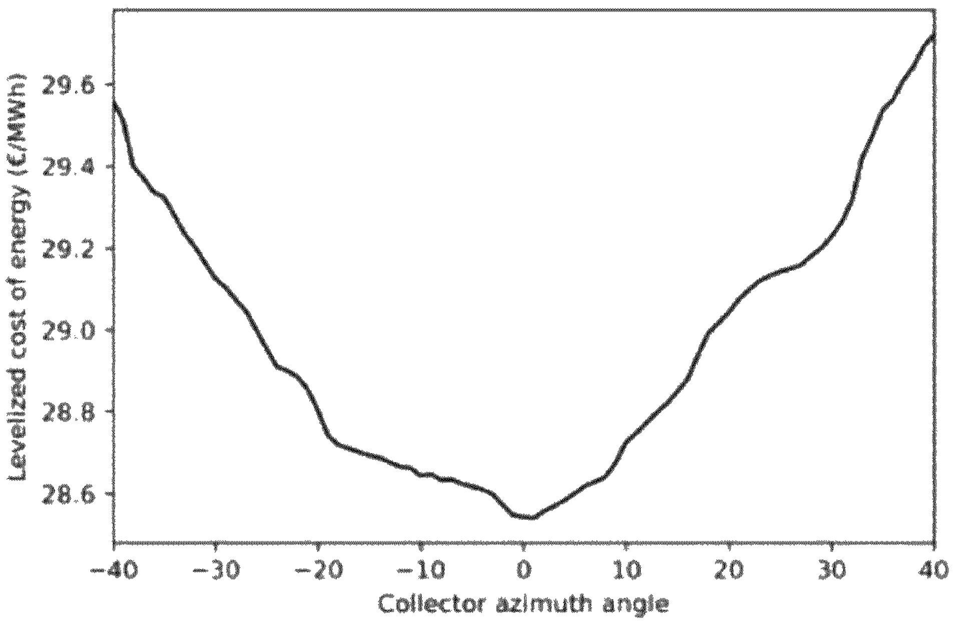
FIG. 5.—Levelized cost of energy as a function of the azimuthal orientation of the vertical PV module. At the origin, the front side of the module is facing the east. For this and subsequent figures, an optimal system installed on a flat, horizontal terrain is assumed, and the produced power is calculated hourly and integrated for a typical meteorological year at Puertollano, Spain.

FIG. 1*b* shows a top view of the preferred embodiment shown in FIG. 1*a*. The bifacial modules are preferably oriented with a front side, being the most efficient side, facing east. The advantage of this module orientation is illustrated in FIG. 5.

Figure 6:
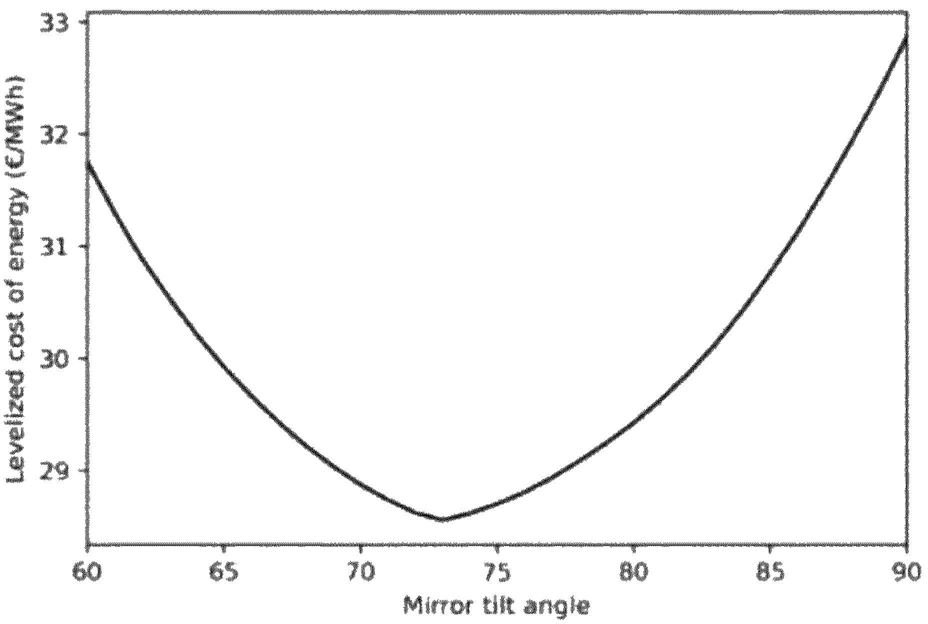
FIG. 6.—Levelized cost of energy as a function of the reflector tilt angle relative to the vertical.
Figure 7:
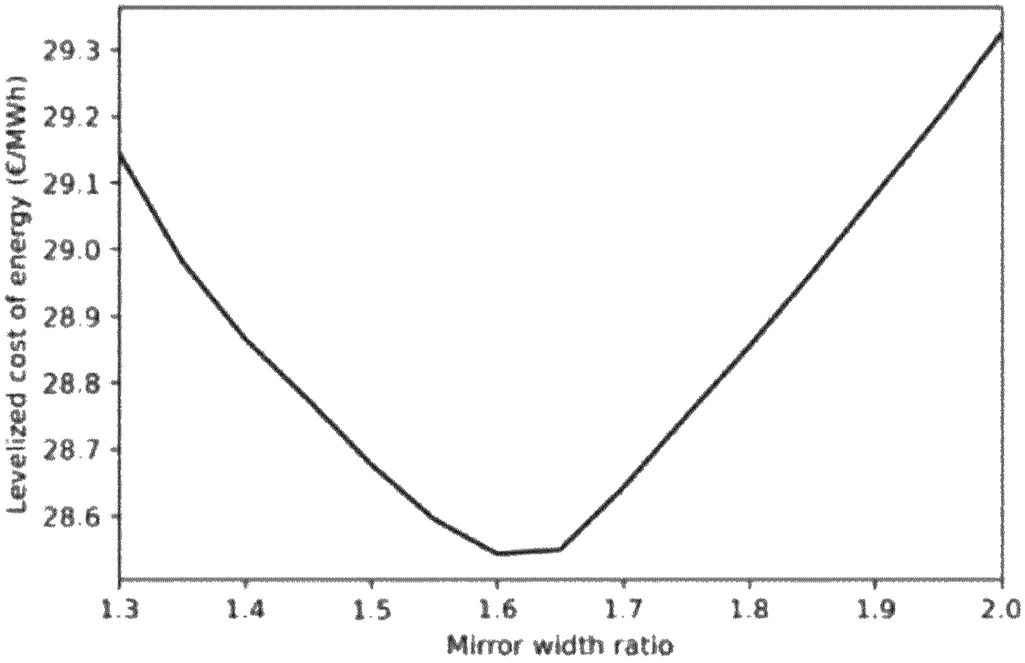
FIG. 7.—Levelized cost of energy as a function of the reflector width relative to the PV module height. The inner edges of the reflectors are assumed to be immediately adjacent to the lower edge of the solar panel modules, and immediately adjacent to the ground.

The reflectors are tilted 73° relative to the vertical towards the immediately adjacent bifacial modules. The advantage of this module orientation is illustrated in FIG. 6. The lateral width of the reflectors is optimized to balance the additional cost of the reflectors with the additional energy yield provided, as illustrated in FIG. 7.

The set of reflective facets (4) are configured so that sunlight incident from the south at low elevation angles (winter noon in the northern hemisphere) is reflected to the bifacial modules (2) facing east/west. The sunlight is reflected to the vertical bifacial PV modules (2). The paths of incident rays from the east (E) and from the south (S) are included in FIG. 1*b* to illustrate the working principle of the invention.

Figure 8:
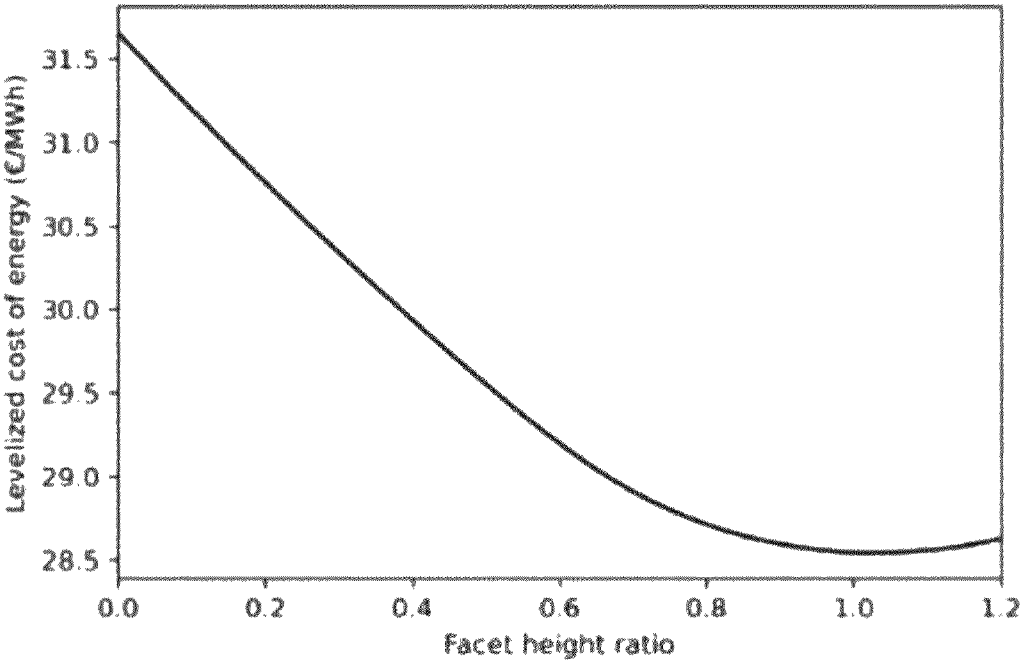
FIG. 8.—Levelized cost of energy as a function of the facet height relative to the facet spacing in an acrylic polymer reflector with total internal reflection facets perpendicular to the main reflector.

The reflective facets (4) are perpendicular to the main reflector plane with a height that matches the facet spacing (the optimal value for this ratio is inversely proportional to the refractive index). As illustrated in FIG. 8, the system performance improves as the size of the facets increases, up to an optimal point when a larger facet size results in losses due to multiple reflections inside the reflector.

Figure 9:
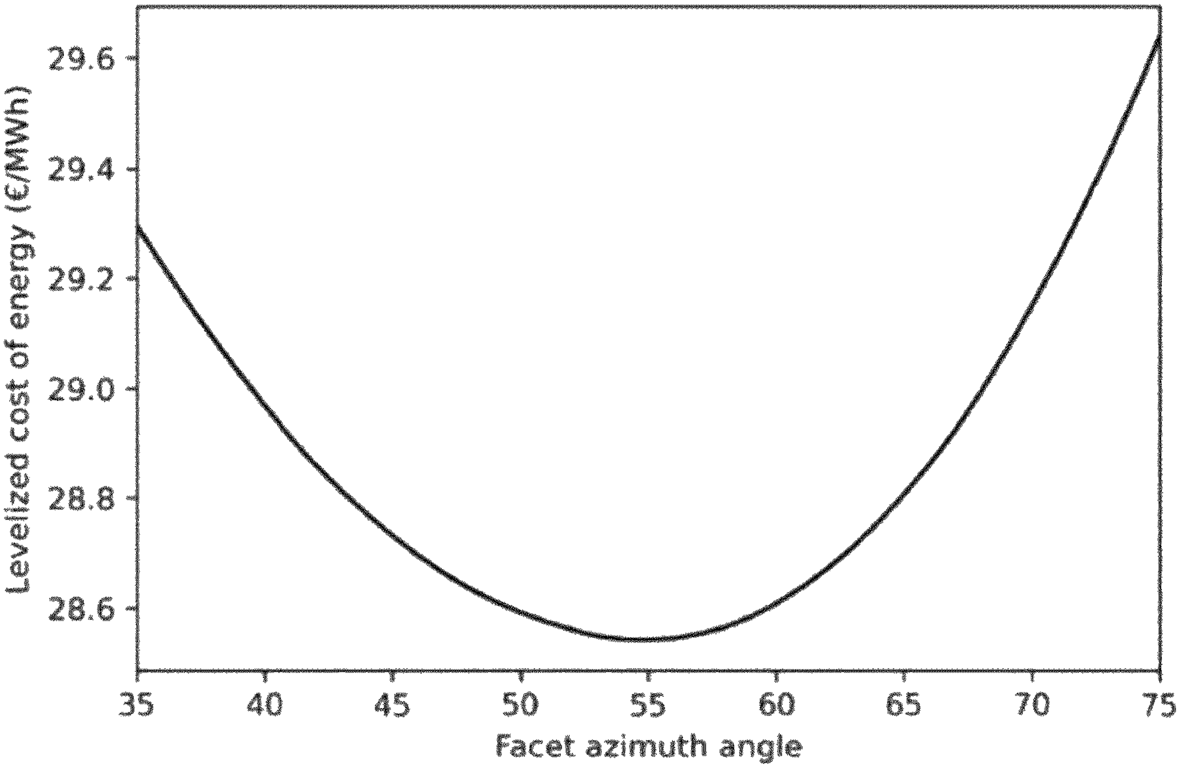
FIG. 9.—Levelized cost of energy as a function of the facet azimuth angle relative to the north-south axis.

The reflective facets (4) are parallel to an azimuthal direction rotated 54°±20° away from the north-south axis, the direction of said rotation being such that the outer ends of the facets (farthest from the modules) are rotated away from the equator. The need for this particular azimuthal orientation of the reflective facets is illustrated in FIG. 9. During winter in the northern hemisphere, when the sun elevation is low, the sunlight from the south during noon is reflected by the facets (4) towards the modules (2). Without the facets (4) most of the winter direct irradiance would be wasted. During summer the sun elevation is high and most of the irradiance is reflected back to the atmosphere by the reflectors (3), protecting the modules (2) from damage due to excessive temperatures.

Although the embodiment illustrated in the figures has a symmetry plane comprising the PV solar panels, such symmetry is not a requirement of the invention, and in most locations the optimal configuration will depart slightly from perfect symmetry within the bounds here specified for the main parameters of the system. Because temperatures tend to be higher in the second half of the day, and the atmosphere is often more transparent in the morning, it might be advantageous to slightly rotate or tilt some of the elements of the system (solar panels, mirrors or facets) as to favor energy production in the first half of the day, in detriment of the energy production in the second half of the day. On the other hand, the economic value of the produced electricity might be higher in the second half of the day, favoring a slightly different geometry.

Alternatively, the solar reflectors (3) may be stamped, embossed, bent, or shaped as to achieve the same effect: an engineered bidirectional reflectance distribution function (BRDF) so that sunlight incident with an azimuth angle parallel to the photovoltaic modules (2) is reflected to the vertical PV module (2).

Figure 2:
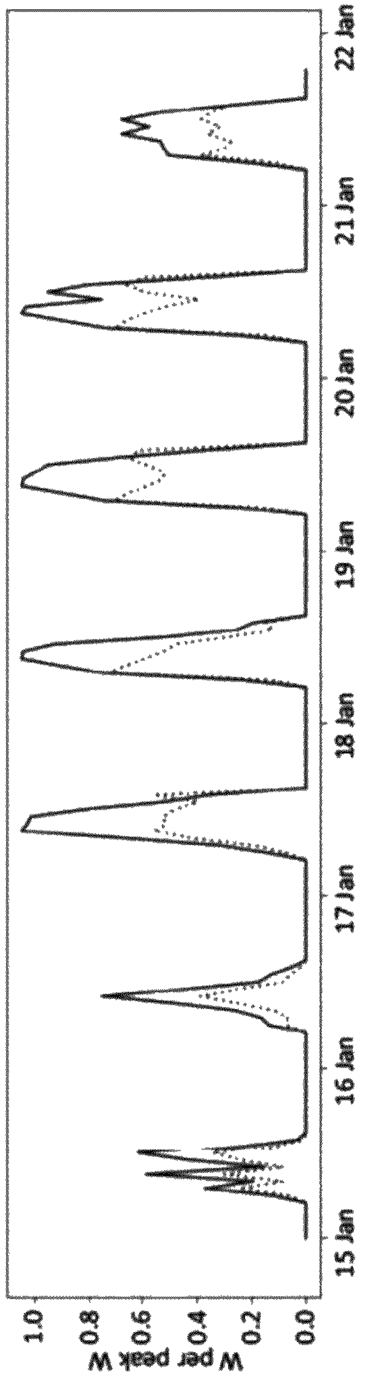
FIG. 2.—Illustrates a graph representing the power production during a typical winter week in Puertollano (Spain) for the present invention (solid line) and for a Horizontal Single Axis Tracker (HSAT) with bifacial photovoltaic modules (dashed line), representative of the most economically advantageous systems in the current state of the art.

FIG. 2 illustrates a graph representing the results on power production during a typical winter week in Puertollano (Spain) for the present invention and a Horizontal Single Axis Tracker (HSAT) with bifacial modules, representative of the most economically advantageous systems in the current state of the art. The present invention produces more power during sunny winter days than state of the art bifacial HSATs, and is less affected by the presence of clouds. It is therein demonstrated that the present invention yields a more abundant, stable, and reliable energy supply in winter.

Figure 3:
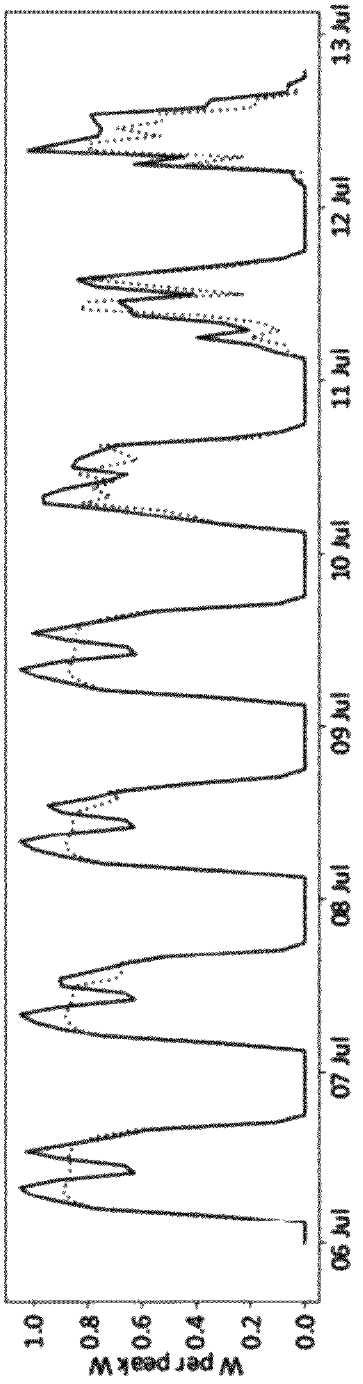
FIG. 3.—Illustrates a graph representing the power production during a typical summer week in Puertollano (Spain) for the present invention (solid line) and for a Horizontal Single Axis Tracker (HSAT) with bifacial photovoltaic modules (dashed line), representative of the most economically advantageous systems in the current state of the art.

FIG. 3 illustrates a graph representing the results on power production during a typical winter week in Puertollano (Spain) for the present invention and a Horizontal Single Axis Tracker (HSAT) with bifacial modules, representative of the most economically advantageous systems in the current state of the art. The present invention is optimized for higher production when the sun elevation angle is low (morning and late afternoon), and the irradiance at the plane of array decreases as the sun elevation angle increases at noon, lowering the energy production at noon, but also lowering the temperature of the solar panels, slowing failure and degradation processes that are known to be thermally activated. The ratio of the yearly energy yield to the installed power capacity for this embodiment of the invention in Puertollano (Spain) is 2634 kWh/kW, while a bifacial HSAT only yields 2134 kWh/kW. This 23% margin leaves ample room to cover the additional cost of the reflectors. The cost of acrylic polymer is currently around 3 €/kg, while transformation and metallizing costs can be negligible in comparison to material costs if mass production is reached.

Figure 4:
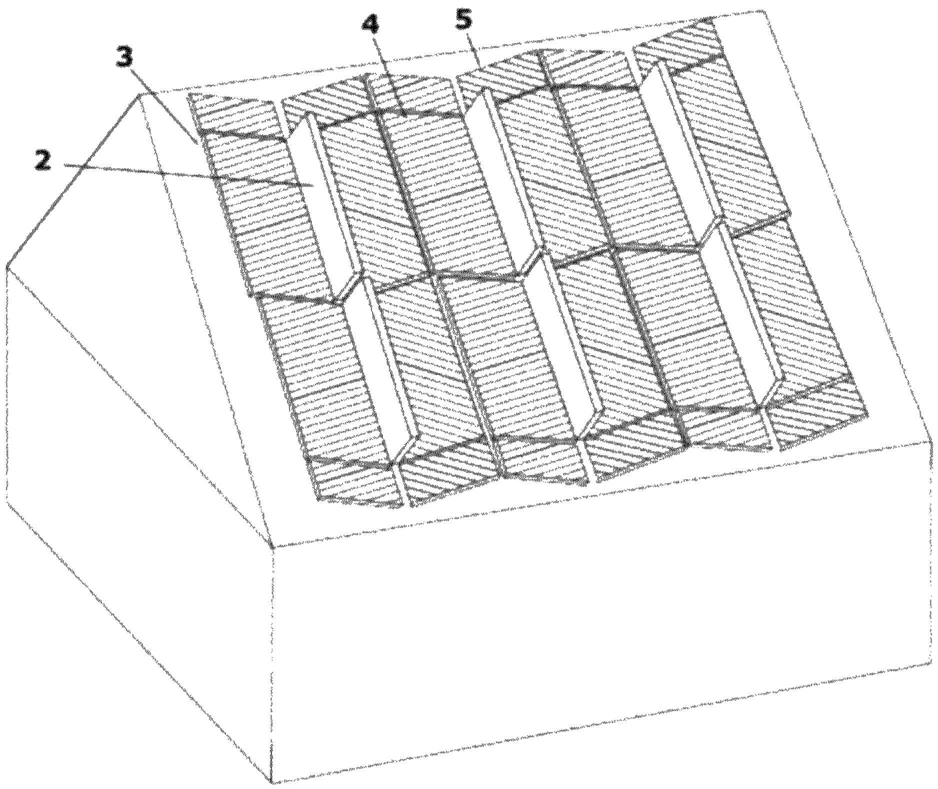
FIG. 4.—Illustrates the invention mounted on a sloped roof, with solar panel modules substantially perpendicular to the east-west axis, and reflectors nearly perpendicular to the modules but slightly tilted towards the adjacent modules. Additional reflector surface area is required at the ends of each row to avoid inhomogeneous reflection at the edges of the system. For clarity, the support structure is not shown in FIG. 4, as the details of the support structure are not an object of the present invention.

As illustrated in FIG. 4, the invention can be adapted to an sloped roof or terrain, as the geometry of the system is not defined relative to the horizontal plane, but relative to the vertical plane comprising the PV modules (2).

Figure 10:
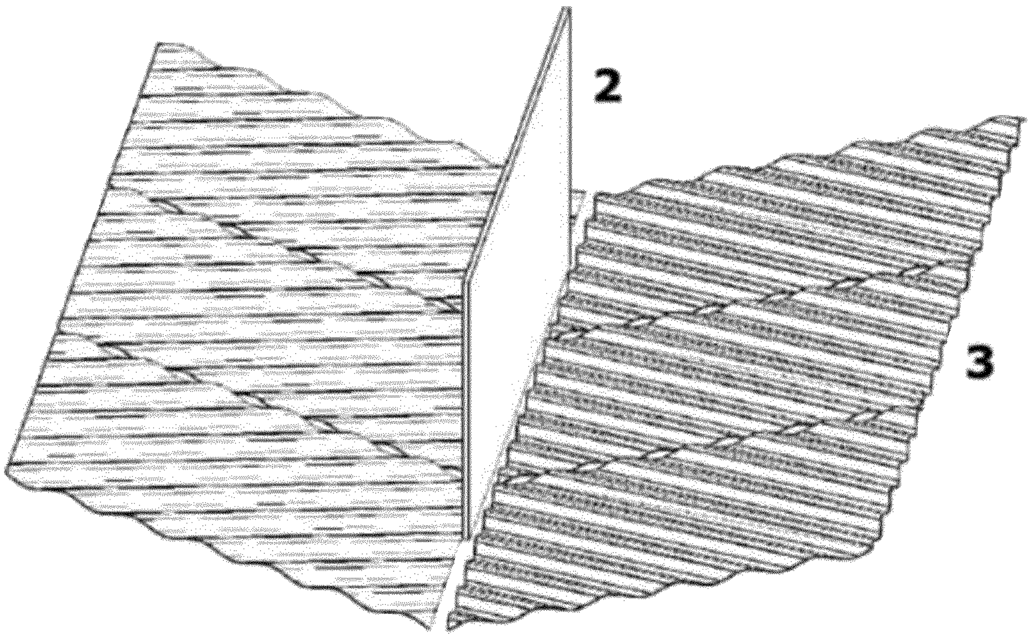
FIG. 10.—Perspective from the south of an embodiment using reflectors made with corrugated aluminum sheet. For clarity, the support structure is not shown in FIG. 10, as the details of the support structure are not an object of the present invention.

As illustrated in FIG. 10, unpolished aluminum or corrugated aluminum sheet for construction roofing can be used for this application to lower costs rather than high optical quality mirrors, as much of the light scattered by scratches and imperfections in the reflector (3) is still collected due to the proximity of the solar panels (2) to the reflector (3). A higher diffuse component in the reflected light also makes the solar panels less likely to be damaged by inhomogeneous illumination. Advantageously, these corrugated aluminum sheet reflectors can be used as an integral part of the roof of a building, serving a double purpose and increasing the return on investment. For greater durability, the aluminum is preferably anodized or protected by a transparent coating. By orienting the facets or corrugations of the roofing sheet along an azimuthal direction 54°±20° away from the north-south axis, a large fraction of the sun-light from the south is reflected towards the solar panel modules. In marine environments or other environments with a high concentration of ionic salts, stainless steel is preferable as a reflector over aluminum due to its higher corrosion resistance. Otherwise, aluminum is preferable due to its higher reflectivity.

Frameless PV solar panels are advantageous for the present invention to avoid the shadow caused by the module frame at grazing incidence. A double glass construction for said modules is also advantageous for structural integrity and slower degradation under high backside irradiance. Due to higher bifaciality factors, for the present invention it is preferable to use modules based on type n silicon solar cell technology such as HJT, TOPCon, or PERT technology.

Figure 11:
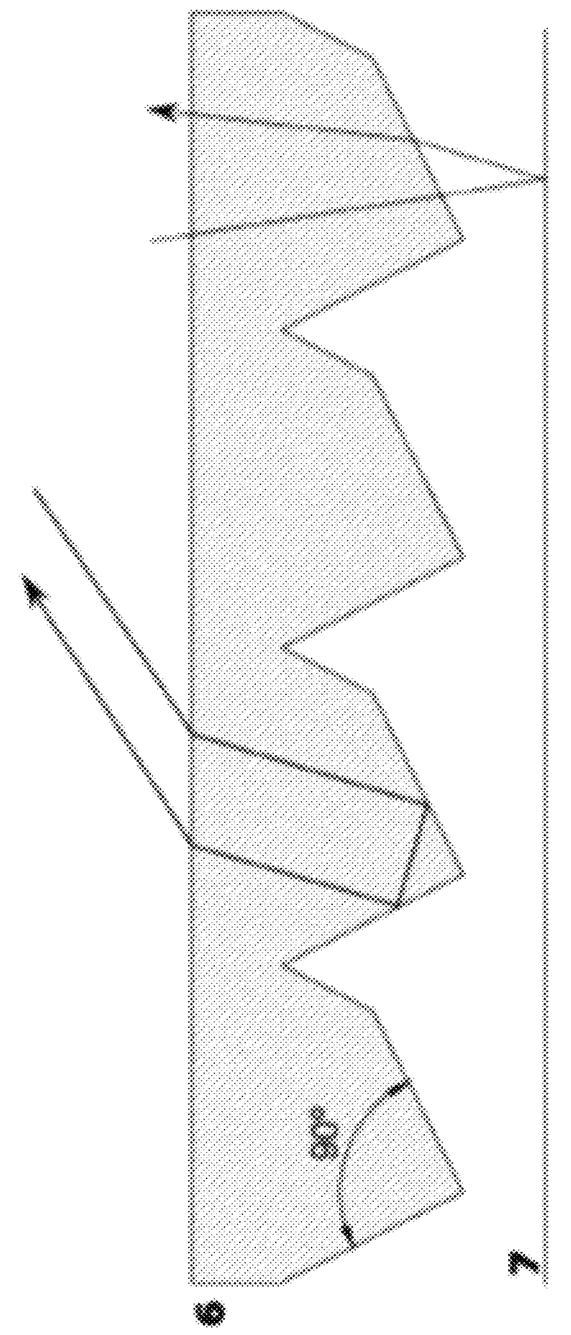
FIG. 11.—Cross section of a dielectric microprismatic array reflector based on total internal reflection designed for high reflectivity at high incidence angles (low solar elevation), with an auxiliary back-reflector.

The purpose of the facets (4) defined on the reflectors (3) is to obtain a bidirectional reflectance distribution function (BRDF) so that sunlight incident with an azimuth angle parallel to the photovoltaic modules (2) is reflected to the vertical PV module (2). An additional embodiment meeting this requirement, as illustrated in FIG. 11, is a cross section of a dielectric microprismatic array reflector based on total internal reflection designed for high reflectivity at high incidence angles (low solar elevation). More in particular, the linear optical element (6) with translation symmetry along a direction perpendicular to the cross section is preferably made of a highly transparent material, such as an acrylic polymer. Those light rays not meeting the requirements for total internal reflection on the optical element (6) are transmitted to an optional backside reflector (7), increasing the energy reflected towards the photovoltaic modules. In this embodiment a microprismatic array (6), that can be fabricated, for example, by roll to roll imprinting on an ultraviolet curing acrylic resin, is used to deflect the incident sunlight. The exemplary optical design in FIG. 11 is similar to a conventional retroreflector based on total internal reflection, but with two modifications: a translational symmetry direction to conserve one of the incident vector components, and an optional tilting of the pair of orthogonal retroreflecting facets so that retroreflection occurs at large incidence angles from the south rather than for normal incidence. When the incident light rays have a large vector component along the translational symmetry direction of the microprismatic array, the effect on the incident vector is best described as a skew reflection or deflection of the incident light, rather than retroreflection, but this still results in some of the incident light reaching the photovoltaic modules, and thus in increased power production. This type of optical element is an angularly selective reflector because at low incidence angles (high solar elevation) there is little or no reflection. An optional additional reflective surface (7) can be used underneath to ensure some reflection at all angles.

Figure 12:
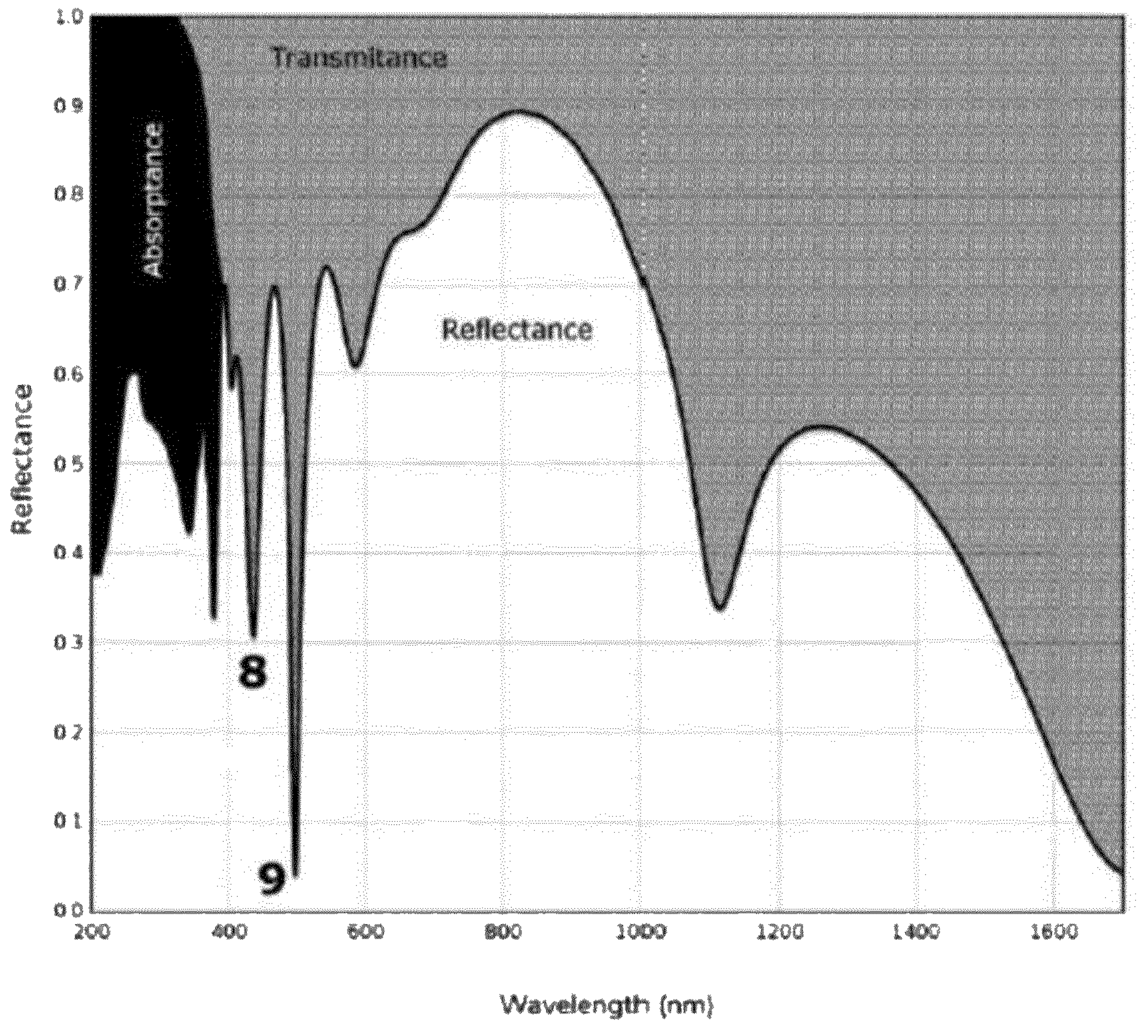
FIG. 12.—Reflectance and transmittance spectrum of a spectrally selective dichroic reflector designed to have transmission peaks at the specific wavelengths of pigments such as chlorophyll and carotene required for photosynthesis.
Figure 13:
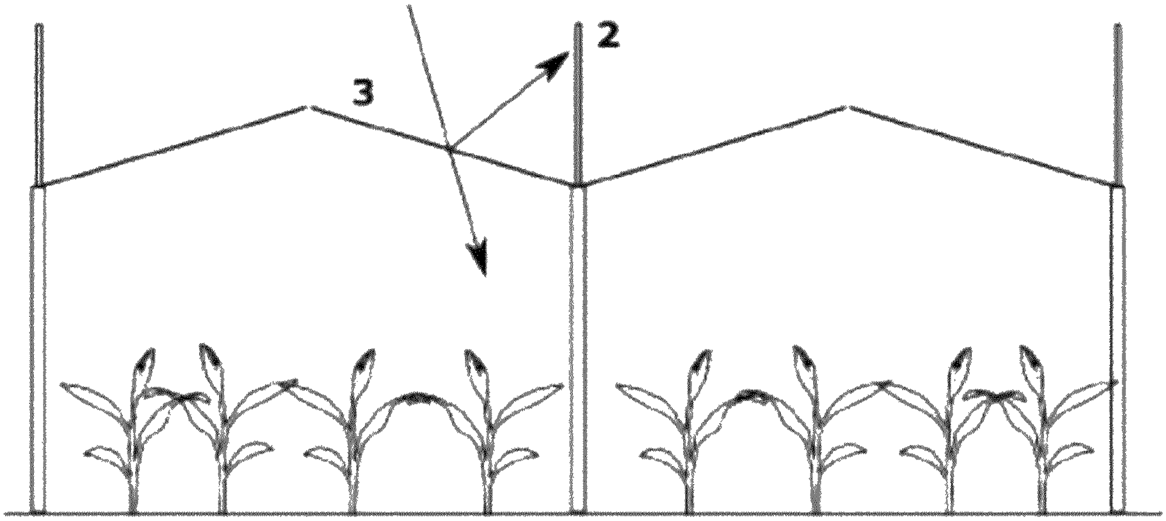
FIG. 13.—View from the south of an agrivoltaic greenhouse with east-west facing vertical bifacial photovoltaic modules and partially transmissive dicroic reflectors. The arrows illustrate the partial transmission and reflection of an incident light ray.

The reflectors (3) and (7) can also be made spectrally selective or dichroic by including transparent multilayers with a periodic refractive index contrast producing constructive interference for reflected light at certain wavelengths. As illustrated in FIG. 12, such dichroic reflectors can be engineered to reflect the range of photon energies most beneficial for photovoltaic power production, while transmitting the specific photon energies required for photosynthesis (8,9), and thus enabling the possibility of agricultural production on the ground under the reflectors, as illustrated in FIG. 13.

FIG. 12 illustrates the reflectance and transmittance spectrum of a spectrally selective dichroic reflector designed to have transmission peaks at the specific wavelengths of pigments such as chlorophyll (8) and carotene (9) required for photosynthesis. The particular example illustrated in FIG. 12 corresponds to a reflector fabricated on a polyethylene terephthalate substrate by deposition of 110 nm of $TiO_2$, followed by 190 nm of $SiO_2$, 95 nm of $TiO_2$, 150 nm of $SiO_2$, 75 nm of $TiO_2$, 120 nm of $SiO_2$, and 60 nm of $TiO_2$. Other lower cost dichroic reflectors can be fabricated using extruded polymer films compensating the lower refractive index contrast with a larger number of layers.

The reflector of FIG. 12 is also designed to have high reflectance above the band gap absorption threshold of the photovoltaic modules (wavelengths <1100 nm) and high transmission of the rest of infrared spectrum to avoid losses caused by unnecessary heating of the photovoltaic modules.

Figure 14:
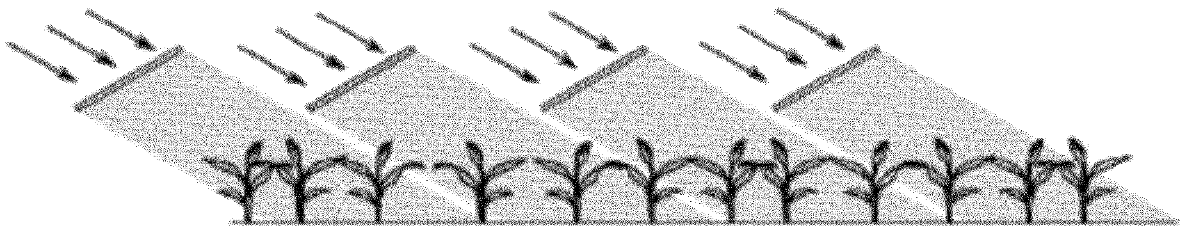
FIG. 14.—View from the east of a representative example of a commercial agrivoltaic system known in the state of the art. During winter the photovoltaic modules shade a large fraction of the crops due to the low elevation angle of the sun.
Figure 15:
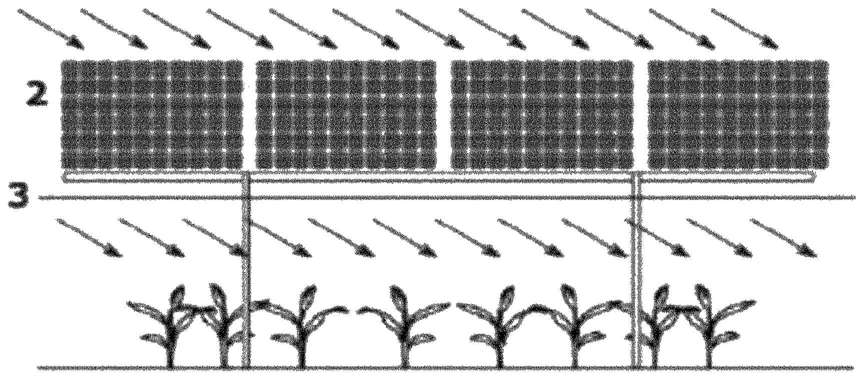
FIG. 15.—View from the east of the agrivoltaic greenhouse representative of the present invention (a view from the south of the same embodiment of the invention is shown in FIG. 13). The arrows on the top represent incident light rays and the arrows on the bottom represent light rays partially transmitted by the spectrally selective reflector. Shadows on the agricultural crops are mostly avoided.

Most conventional agrivoltaic systems, as illustrated by example in FIG. 14, use either tracking or south facing photovoltaic modules, inevitably resulting in shading and reduced agricultural yield. The main advantage of the present invention in comparison with state-of-the-art agrivoltaic systems is not only the higher energy yield afforded by the reflectors, but also the fact that the solar panels are sideways during winter noon, thus maximizing the available sunlight for photosynthesis, as illustrated in FIG. 15 by a view from the east during winter noon of a preferred embodiment of the invention.

What is claimed is:

1. A bifacial photovoltaic system including metallic or substantially specular reflector surfaces, said bifacial photovoltaic system comprising:

at least a bifacial photovoltaic module mounted on a support structure in a position substantially perpendicular to the east-west axis, with an allowable deviation of ±20°, at least two metallic or substantially specular reflectors on each side of the bifacial photovoltaic module with a diffuse reflectance being less than half of the total hemispheric reflectance, wherein a width of the reflectors in the direction perpendicular to the north-south axis is 1.67 times the height of the photovoltaic module in the direction perpendicular to the ground, with an allowable deviation of ±30% of said width, and wherein the reflectors are tilted to face each side of the bifacial photovoltaic module, so that the planes comprising the reflectors intersect the planes comprising the bifacial photovoltaic module at an angle substantially of 73°, with an allowable deviation of ±20°, wherein the reflectors comprise a plurality of facets parallel to an azimuthal direction, rotated ±54° away from the north-south axis with an allowable deviation of ±20°, the direction of said rotation being so that the outer ends of the facets farthest from the photovoltaic module are rotated away from the equator.

2. The photovoltaic system according to claim 1, comprising a plurality of bifacial photovoltaic modules, and a plurality of reflectors, arranged in at least a row along the north-south axis with an allowable deviation of ±200.

3. The photovoltaic system according to claim 2, wherein the reflectors at both ends of each row extend over a longer distance than the bifacial photovoltaic modules along the north-south axis to avoid an inhomogeneous reflection on the bifacial photovoltaic modules at the edges of the row.

4. The photovoltaic system according to claim 2, wherein a plurality of said rows are repeatedly arranged separated along the east-west axis by a distance 3.2 times larger than the height of the photovoltaic module in the direction perpendicular to the ground, with an allowable deviation of ±1.1 times said height.

5. The photovoltaic system according to claim 2, wherein the reflectors are polymer mirrors.

6. The photovoltaic system according to claim 1, wherein the reflectors are made of metal sheet.

7. The photovoltaic system according to claim 6, wherein the reflectors are made of unpolished aluminum, corrugated aluminum or stainless steel sheet.

8. The photovoltaic system according to claim 1, wherein the reflectors are glass mirrors.

9. The photovoltaic system according to claim 8, wherein at least some of the facets are polymer surfaces producing total internal reflection and/or metallized polymer surfaces.

10. The photovoltaic system according to claim 1, wherein the reflectors are polymer mirrors.

11. The photovoltaic system according to claim 10, wherein at least some of the facets are cracks or fissures in the glass producing total internal reflection and/or metallized glass surfaces.

12. The photovoltaic system according to claim 10, wherein at least some of the facets are polymer surfaces producing total internal reflection and/or metallized polymer surfaces.

13. The photovoltaic system according to claim 1, wherein planes comprising the reflectors and a plane comprising the photovoltaic module intersect at an angle between 65° and 83°.

14. The photovoltaic system according to claim 1, wherein the reflectors comprise a dielectric microprismatic array with translation symmetry along one direction, wherein said microprismatic array operates by total internal reflection at certain incidence angles.

15. The photovoltaic system according to claim 14, wherein an additional reflective surface underneath the microprismatic array reflects light rays that are transmitted by the microprismatic array when the incidence angle does not meet the total internal reflection condition.

16. The photovoltaic system according to claim 1, wherein at least one reflective surface of the reflectors is spectrally selective to selectively reflect photons with energies above the band gap absorption threshold of the photovoltaic module, while transmitting photons with the specific wavelengths required for photosynthesis and absorbing deleterious ultraviolet photons.

17. Assembling method for assembling a photovoltaic system according to claim 1, the method comprising:

placing the at least one bifacial photovoltaic module on a static support structure;

orienting the at least one bifacial photovoltaic module in a position substantially perpendicular to the east-west axis, with an allowable deviation of ±20°;

placing the at least two specular or metallic reflectors on said support structure, tilted to face each side of the bifacial photovoltaic module, so that a plane comprising the reflectors intersects a plane comprising the bifacial photovoltaic module at an angle substantially of 73°, with an allowable deviation of ±20°, and placing the plurality of facets on the reflectors parallel to an azimuthal direction, 54° away from the north-south axis with an allowable deviation of ±20°, so that the outer ends of the facets farthest from the photovoltaic module are rotated away from the equator.

18. A bifacial photovoltaic system including metallic or substantially specular reflector surfaces, said bifacial photovoltaic system comprising:

at least a bifacial photovoltaic module mounted on a support structure in a position substantially perpendicular to the east-west axis, with an allowable deviation of ±20° at least two metallic or substantially specular reflectors on each side of the bifacial photovoltaic module with a diffuse reflectance being less than half of the total hemispheric reflectance, wherein a width of the reflectors in the direction perpendicular to the north-south axis is 1.67 times the height of the photovoltaic module in the direction perpendicular to the ground, with an allowable deviation of ±30% of said width, and wherein the reflectors are tilted to face each side of the bifacial photovoltaic module, so that the planes comprising the reflectors intersect the planes comprising the bifacial photovoltaic module at an angle between 65° and 83°, wherein the reflectors comprise a plurality of facets parallel to an azimuthal direction, rotated ±54° away from the north-south axis with an allowable deviation of ±20°, the direction of said rotation being so that the outer ends of the facets farthest from the photovoltaic module are rotated away from the equator.

19. The bifacial photovoltaic system according to claim 18, comprising a plurality of bifacial photovoltaic modules, and a plurality of reflectors, arranged in at least a row along the north-south axis with an allowable deviation of ±20°, wherein the reflectors at both ends of each row extend over a longer distance than the bifacial photovoltaic modules along the north-south axis to avoid an inhomogeneous reflection on the bifacial photovoltaic modules at the edges of the row.

20. The bifacial photovoltaic system according to claim 19, wherein the reflectors are polymer mirrors.

* * * * *